United States Patent
Wu (10) Patent No.: US 8,306,059 B2
(45) Date of Patent: Nov. 6, 2012

(54) METHOD OF CONSTRUCTING AND TRANSMITTING PACKETS WITH MIMO CONFIGURATION IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 501 days.

(21) Appl. No.: 12/264,922

(22) Filed: Nov. 5, 2008

(65) Prior Publication Data

US 2010/0111206 A1 May 6, 2010

(51) Int. Cl.
*H04J 3/16* (2006.01)
*H04J 3/22* (2006.01)
*H04W 80/06* (2009.01)

(52) U.S. Cl. ........ 370/469; 370/474; 370/472; 370/468; 370/349; 370/338

(58) Field of Classification Search .......... 370/208–210, 370/335, 342, 469, 474, 328–329, 466, 338, 370/473, 349
See application file for complete search history.

(56) References Cited

U.S. PATENT DOCUMENTS

| 6,850,540 | B1 * | 2/2005 | Peisa et al. | 370/468 |
|---|---|---|---|---|
| 6,950,420 | B2 * | 9/2005 | Sarkkinen et al. | 370/338 |
| 7,190,701 | B2 * | 3/2007 | Yi et al. | 370/469 |
| 7,200,135 | B2 * | 4/2007 | Choi et al. | 370/348 |
| 7,580,388 | B2 * | 8/2009 | Kim | 370/329 |
| 7,672,261 | B2 * | 3/2010 | Lee et al. | 370/312 |
| 7,746,833 | B2 * | 6/2010 | Terry | 370/335 |
| 7,798,640 | B2 * | 9/2010 | Chehab et al. | 351/205 |
| 7,817,669 | B2 * | 10/2010 | Pani et al. | 370/474 |
| 7,872,980 | B2 * | 1/2011 | Kuusinen et al. | 370/252 |
| 7,933,292 | B2 * | 4/2011 | Lee et al. | 370/469 |
| 7,936,733 | B2 * | 5/2011 | Okamoto et al. | 370/338 |
| 7,936,735 | B2 * | 5/2011 | Obuchi et al. | 370/338 |
| 7,949,012 | B2 * | 5/2011 | Chang et al. | 370/474 |
| 8,000,348 | B2 * | 8/2011 | Otonari et al. | 370/474 |
| 8,050,292 | B2 * | 11/2011 | Wu | 370/470 |
| 2003/0095519 | A1 * | 5/2003 | Kuo et al. | 370/338 |
| 2005/0213605 | A1 | 9/2005 | Kim | |

(Continued)

FOREIGN PATENT DOCUMENTS

| EP | 1 720 322 A1 | 11/2006 |
|---|---|---|
| WO | 2007091965 A2 | 8/2007 |
| WO | 2007091965 A3 | 8/2007 |

OTHER PUBLICATIONS

Ericsson: "MAC Happy Bits for UL", 3GPP TSG-RAN WG2 #59bis, Tdoc R2-074059, Oct. 8-12, 2007, XP050136691, Shanghai, China.

(Continued)

*Primary Examiner* — Andrew Lai
*Assistant Examiner* — Candal Elpenord
(74) *Attorney, Agent, or Firm* — Winston Hsu; Scott Margo (57) ABSTRACT

A method of constructing and transmitting packets with multiple-input multiple-output, hereinafter called MIMO, configuration in a radio link control layer of a wireless communication system includes, in a transmission opportunity, transforming at least an RLC service data unit into at least an RLC protocol data unit, hereinafter called PDU, according to an RLC PDU allowance of each of a plurality of transport blocks. Each of the at least an RLC PDU fits within at least an RLC PDU allowance of the plurality of transport blocks.

8 Claims, 4 Drawing Sheets

U.S. PATENT DOCUMENTS

| | | | |
|---|---|---|---|
| 2006/0198303 A1* | 9/2006 | Iacono et al. | 370/229 |
| 2007/0047574 A1* | 3/2007 | Ling | 370/465 |
| 2008/0165805 A1* | 7/2008 | Terry et al. | 370/474 |
| 2009/0225711 A1* | 9/2009 | Sammour et al. | 370/329 |
| 2009/0323842 A1* | 12/2009 | Zhang et al. | 375/260 |
| 2010/0135212 A1* | 6/2010 | Ho et al. | 370/328 |

OTHER PUBLICATIONS

Nokia Corporation, Nokia Siemens Networks: "Criteria for Short and Long BSR", 3GPP TSG-RAN WG2 Meeting #60bis, R2-080015, Jan. 14-18, 2008, XP050137919, Sevilla, Spain.

Kim J et al: "On the Performance of Multiuser MIMO Systems in WCDMA/HSDPA: Beamforming, Feedback and User Diversity", IEICE Trans. Commun., vol. E89-B. No. 8 Aug. 2006, Tokyo, JP, pp. 2161-2169, XP001246274.

3GPP, 3GPP TS 36.321 V8.1.0 "Technical Specification Group Radio Access Network, Evolved Universal Terrestrial Radio Access (E-UTRA), Medium Access Control (MAC) protocol specification (Release 8)", Mar. 2008.

3GPP, 3GPP TSG-RAN2 Meeting #62 R2-082486, May 2008.

\* cited by examiner

METHOD OF CONSTRUCTING AND TRANSMITTING PACKETS WITH MIMO CONFIGURATION IN A WIRELESS COMMUNICATION SYSTEM AND RELATED COMMUNICATION DEVICE

BACKGROUND OF THE INVENTION

1. Field of the Invention

The present invention relates to a method for packet transmission and prioritization, and more particularly, to a method of constructing and transmitting packets with MIMO (Multiple-input Multiple-Output) configuration in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A radio link control (RLC) layer is responsible for data transfer of radio bearers from an upper layer, a Packet Data Convergence Protocol (PDCP) layer, and employs three RLC entities of TM, UM, and AM RLC entities responsible for functions of transfer modes of Transparent Mode (TM), Unacknowledged Mode (UM) and Acknowledged Mode (AM) respectively. An RLC entity generates RLC protocol data units (PDUs) with RLC service data units (SDUs) and exchanges the RLC PDUs with its peer RLC entity via lower layers.

The RLC entity uses three types of RLC PDUs, which are data RLC PDUs, retransmission RLC PDUs, and control RLC PDUs. The transmission priority is control RLC PDUs>retransmission RLC PDUs>data RLC PDUs. The data RLC PDUs in UM are called UMD PDUs, whereas the data RLC PDUs in AM are called AMD PDUs.

A UM RLC entity, either in the E-UTRAN or in the UE, is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers.

An AM RLC entity, either in the E-UTRAN or in the UE, consists of a transmitting side and a receiving side and supports segmentation, retransmission, sequence check and other functions. The receiving side of the AM RLC entity delivers RLC SDUs to the upper layers and receives RLC PDUs from its peer AM RLC entity via the lower layer. The transmitting side of the AM RLC entity receives RLC SDUs from upper layers and delivers RLC PDUs to its peer AM RLC entity via the lower layer.

The MAC layer, a lower layer of the RLC layer supports functions of mapping between logical channels and transport channels, multiplexing, de-multiplexing, logical channel prioritization, transport format selection, and so on. The MAC layer of the LTE system does not support packet segmentation. An MAC entity of the MAC layer exchanges RLC PDUs, seen as MAC SDUs, with the RLC layer via logic channels and MAC PDUs with the physical layer via transport channels, such as an uplink shared channel (UL-SCH) or a downlink shared channel (DL-SCH). An MAC SDU is an identity title of an RLC PDU when being sent to the MAC layer.

At a particular transmission time interval (TTI) regarded as a particular transmission opportunity, a transport block (TB) is provided for the MAC entity, and the MAC entity determines a total size of RLC PDU(s) according to the TB size.

When the transmitting side of the AM RLC entity forms AMD PDUs from RLC SDUs, the transmitting side segments and/or concatenates RLC SDUs so that the AMD PDUs fit within the total size of RLC PDU(s) indicated by the MAC layer at the particular transmission opportunity. The transmitting UM RLC entity works in the same way as the transmitting side of the AM RLC entity when forming UMD PDUs from RLC SDUs.

In the LTE system, a MIMO (Multiple-input Multiple-Output) function is employed to increase the end-user data rate and cell capacity. A transceiver with MIMO function employs multiple transmitting and receiving antennas to substantially enhance the air interface data rate performance.

When the MIMO configuration is applied to the physical, MAC and RLC layers, multiple TBs are allowed in a transmission opportunity, causing problems of MAC/RLC packet construction and transmission. In the following, five scenarios are provided to describe the problems in the prior art, and the receiver and the transmitter of each scenario both employ two antennas for MIMO operation, known as 2×2 MIMO.

The first scenario is described as below. When an eNB allocates two TBs with each TB size of 500 bytes to a UE in a particular transmission opportunity and an RLC entity (AM or UM RLC entity) in the UE has data to send, the total size of RLC PDUs is 2×500=1000 bytes and thereby the MAC layer of the UE indicates the RLC entity of a 1000-byte RLC PDU allowance for transmission. Meanwhile, the RLC entity has RLC SDUs with a total size of 1500-byte in the transmission buffer. For simplicity, the example herein does not take MAC sub-headers and MAC control elements into consideration for TB payload. In this situation, the RLC entity constructs a 1000-byte RLC PDU and submits the RLC PDU to the MAC layer for transmission. However, the MAC layer is not able to transmit this RLC PDU since the size of the RLC PDU is larger than the TB size.

The second scenario is described as below. When an eNB allocates two TBs with each TB size of 500 bytes to a UE in a particular transmission opportunity and an AM RLC entity in the UE has data to send, the total size of RLC PDUs is 2×500=1000 bytes and thereby the MAC layer indicates the AM RLC entity of 1000 bytes for transmission. Like the first scenario, the second scenario does not count in the corresponding MAC sub-headers and MAC control elements for TB payload. Meanwhile, the AM RLC entity generates a control RLC PDU with 5 bytes and has a retransmission RLC PDU with 600 bytes and also RLC SDUs with 1000 bytes in transmission buffer. In this situation, the AM RLC entity generates an RLC PDU with 395 bytes and submits the control RLC PDU, the retransmission RLC PDU, and the generated RLC PDU to the MAC layer. However, the MAC layer is not able to transmit the retransmission RLC PDU since the size of the retransmission RLC PDU is larger than the TB size.

The third scenario is described as below. When an eNB allocates two TBs with each TB size of 500 bytes to a UE in a particular transmission opportunity and an AM RLC entity in the UE has data to send, the total size of RLC PDUs is 2×500=1000 bytes and thereby the MAC layer indicates the AM RLC entity of two total size of RLC PDU(s) each with 500 bytes for transmission. Like the first scenario, the third scenario does not take the corresponding MAC sub-headers and MAC control elements into account for TB payload. Meanwhile, the AM RLC entity generates a control RLC PDU with 5 bytes and has a retransmission RLC PDU 500 bytes (2 bytes header+498 bytes data) and RLC SDUs with 1000 bytes in the transmission buffer. According to the prior art, the AM RLC entity possibly follows a first-in, first-out rule and therefore thinks that the retransmission RLC PDU is sent with the control RLC PDU. In this situation, the AM RLC entity segments the retransmission RLC PDU into two RLC PDU segments with 495 bytes (4-byte header+491-byte data) and 11 bytes (7-byte data+4-byte header) and also generates an 489-byte RLC PDU including RLC SDUs. The 495-byte RLC PDU segment and the 5-byte control RLC PDU are submitted to the MAC layer for the first TB, while the 11-byte RLC PDU segment and the 489-byte RLC PDU are submitted for the second TB.

In the third scenario, the RLC entity has to segment the retransmission RLC PDU to fit within the TB size due to the first-in, first-out rule of the prior art.

Before description of the fourth and fifth scenarios, a buffer status report (BSR) in the MAC layer is introduced. The BSR is used for providing a serving eNB with information about the amount of data in the UL buffers of a UE. There are three types of BSRs: regular BSR, periodic BSR, and padding BSR. The regular and periodic BSRs are sent via MAC control elements included in a MAC PDU, where the padding BSR is sent by being included padding bits, if needed, of the MAC PDU. Every BSR can be generated in a short or long BSR.

With fundamental knowledge of the BSR, the fourth scenario is described as below. An eNB allocates two TBs with each TB size of 20 bytes to a UE in a particular transmission opportunity and an AM RLC entity in the UE has a STATUS PDU as well as a control RLC PDU with 20 bytes for transmission. A short BSR is triggered and generated with one byte so one of the TBs includes this short BSR, and furthermore the AM RLC entity uses the TB containing this short BSR to transmit the STATUS PDU. This causes a partial STATUS PDU with 19 bytes because the TB cannot afford the original 20-byte STATUS PDU.

A partial STATUS PDU includes part info of the original STATUS PDU, meanings that some PDU NACK (negative acknowledgment) information of the original STATUS PDU cannot be in the particular transmission opportunity. Thus, the transmitter of a peer RLC entity cannot know that corresponding PDUs have been received unsuccessfully for the particular transmission opportunity. The PDU NACK information has to wait for being reported at the next or later transmission opportunity, causing inefficiency in packet transmission.

The fifth scenario is described as below. In the current spec related to MAC layer, only one BSR is sent when any of BSR events is triggered. Assuming that an eNB allocates two TBs each corresponding to one MAC PDU and a regular BSR event is triggered, the MAC entity includes a regular BSR in either one of the two MAC PDUs corresponding to the TBs. In this situation, even if the MAC PDU without regular BSR has space for a padding BSR, the MAC PDU does not include the padding BSR. As a result, if the MAC PDU with the Regular BSR is lost during transmission, the eNB cannot know the UE buffer status and thereby cannot provide enough resource for the UE transmission.

SUMMARY OF THE INVENTION

The present invention therefore provides a method and related communication device of constructing and transmitting packets with MIMO configuration for an RLC and a MAC layer of a wireless communication system to solve the abovementioned problems of the prior art.

The present invention discloses a method of constructing and transmitting packets with MIMO configuration in an RLC layer of a wireless communication system. The method includes, in a transmission opportunity, transforming at least an RLC SDU into at least an RLC PDU according to an RLC PDU allowance of each of a plurality of transport blocks. Each of the at least an RLC PDU fits within at least an RLC PDU allowance of the plurality of transport blocks.

The present invention further discloses a communication device of a wireless communication system for constructing and transmitting packets with MIMO configuration in an RLC layer. The communication device, as well as a computer program product, includes a processor, a communication interfacing unit, a control unit and a computer readable recording medium. The processor is used for processing storage data. The communication interfacing unit is used for exchanging signals with a peer communication device. The control unit is coupled to the processor and communication interfacing unit, and used for controlling the communication interfacing unit and the communication device according to processing results of the processor. The computer readable recording medium is coupled to the processor and used for storing the storage data. The storage data includes program code for, in a transmission opportunity, transforming at least an RLC SDU into at least an RLC PDU according to an RLC PDU allowance of each of a plurality of transport blocks, where each of the at least an RLC PDU fits within at least an RLC PDU allowance of the plurality of transport blocks.

The present invention further discloses a method of constructing and transmitting packets with MIMO configuration in an RLC layer of a wireless communication system. The method includes obtaining an RLC PDU allowance of each of a plurality of transport blocks for a transmission opportunity, and then, in the transmission opportunity, selecting a transport block from the plurality of transport blocks to accommodate an RLC PDU. The RLC PDU allowance of the selected transport block is equal to or greater than a size of the RLC PDU.

The present invention further discloses a communication device of a wireless communication system for constructing and transmitting packets with MIMO configuration in an RLC layer. The communication device as well as a computer program product includes a processor, a communication interfacing unit, a control unit and a computer readable recording medium. The processor is used for processing storage data. The communication interfacing unit is used for exchanging signals with a peer communication device. The control unit is coupled to the processor and communication interfacing unit, and used for controlling the communication interfacing unit and the communication device according to processing results of the processor. The computer readable recording medium is coupled to the processor and used for storing the storage data. The storage data includes program code for obtaining an RLC PDU allowance of each of a plurality of transport blocks for a transmission opportunity, and program code for, in the transmission opportunity, selecting a transport block from the plurality of transport blocks to accommodate an RLC PDU, where the RLC PDU allowance of the selected transport block is equal to or greater than a size of the RLC PDU.

The present invention further discloses a method of constructing and transmitting packets with MIMO configuration in a MAC layer of a wireless communication system. The method includes receiving a plurality of transport blocks for a transmission opportunity, and then, in the transmission opportunity, including a buffer status report in each of a plurality of MAC protocol data units corresponding to the plurality of transport blocks when a buffer status report event is triggered.

The present invention further discloses a communication device of a wireless communication system for constructing and transmitting packets with MIMO configuration in an RLC layer. The communication device as well as a computer program product includes a processor, a communication interfacing unit, a control unit and a computer readable recording medium. The processor is used for processing storage data. The communication interfacing unit is used for exchanging signals with a peer communication device. The control unit is coupled to the processor and communication interfacing unit, and used for controlling the communication interfacing unit and the communication device according to processing results of the processor. The computer readable recording medium is coupled to the processor and used for storing the storage data. The storage data includes program code for receiving a plurality of transport blocks for a transmission opportunity, and program code for, in the transmission opportunity, including a buffer status report in each of a plurality of MAC protocol data units corresponding to the plurality of transport blocks when a buffer status report event is triggered.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
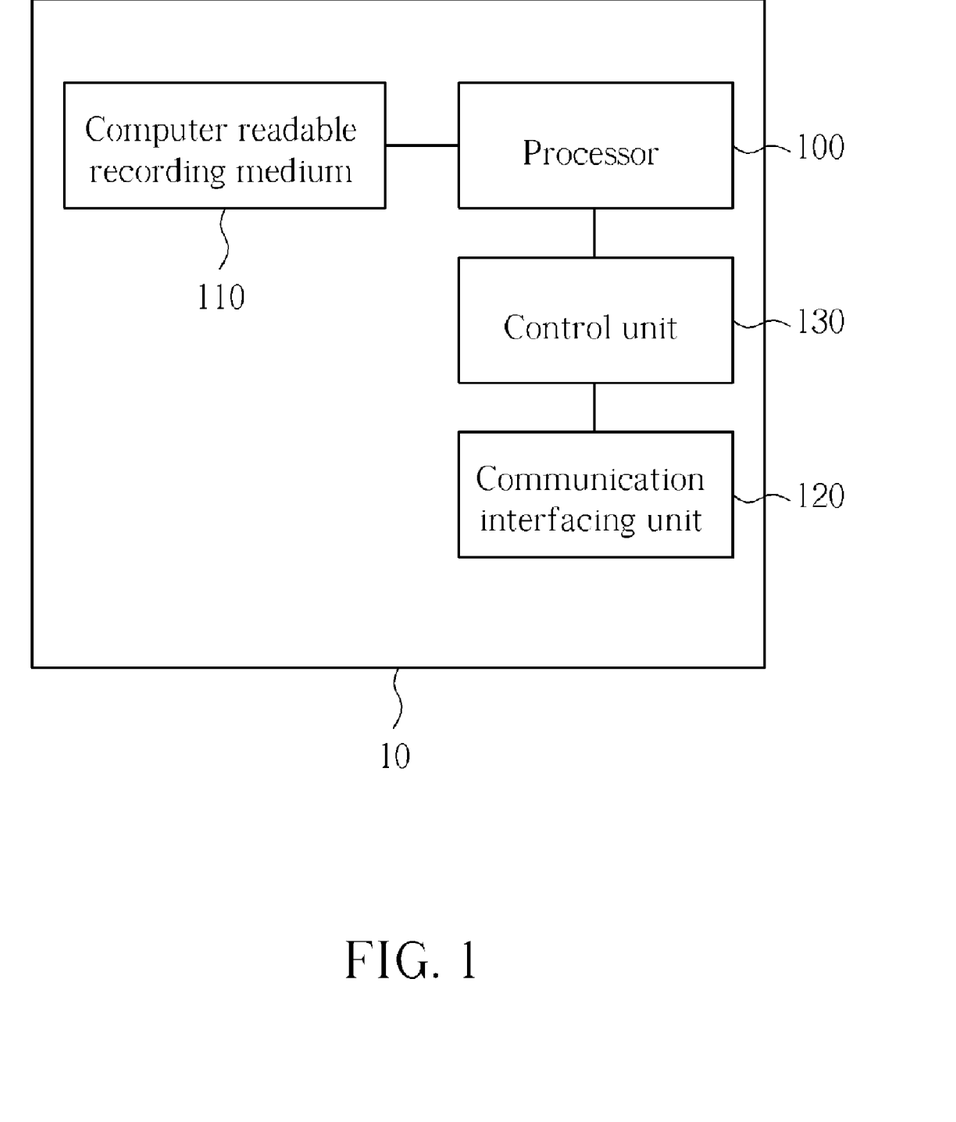
FIG. 1 is a schematic diagram of a communication device according to embodiments of the present invention.

Please refer to FIG. 1, which illustrates a schematic diagram of a communication device 10 according to embodiments of the present invention. The communication device 10 as well as a computer program product is preferably used in a LTE (Long Term Evolution) communication system and includes a processor 100, a computer readable recording medium 110, a communication interfacing unit 120 and a control unit 130. The computer readable recording medium 110 is any data storage device that stores storage data, including program code and related parameters, and the storage data is thereafter read and processed by the processor 100. Examples of the computer readable recording medium 110 include read-only memory (ROM), random-access memory (RAM), CD-ROMs, magnetic tapes, hard disks, optical data storage devices, and carrier waves (such as data transmission through the Internet). The control unit 130 controls the communication interfacing unit 120 and related operations and states of the communication device 10 according to processed results of the process 100. The communication interfacing unit 120 is responsible for exchanging signals with a peer communication device which represents a communication device performs functions of a peer communication protocol.

The communication device 10 can be used in an evolved Node-B (eNB) or in a UE equipped with MIMO configuration and thereby the communication interfacing unit 120 works with multiple antennas for data transmission. The storage data includes program code corresponding to the physical, MAC, and RLC layers. The program code of the physical layer is used for providing a plurality of transport blocks (TBs) for the MAC layer. The program code of the MAC layer is used for processing MAC protocol data units (PDUs) and MAC service data units (MAC SDUs). For a UE, the program code of the MAC layer also handles buffer status reports (BSRs) for providing information of uplink data for the eNB so that the eNB can allocate enough resources to the UE. The program code of the RLC layer is used for processing RLC SDUs and RLC PDUs. In this situation, embodiments of present invention are provides as follow.

Figure 2:
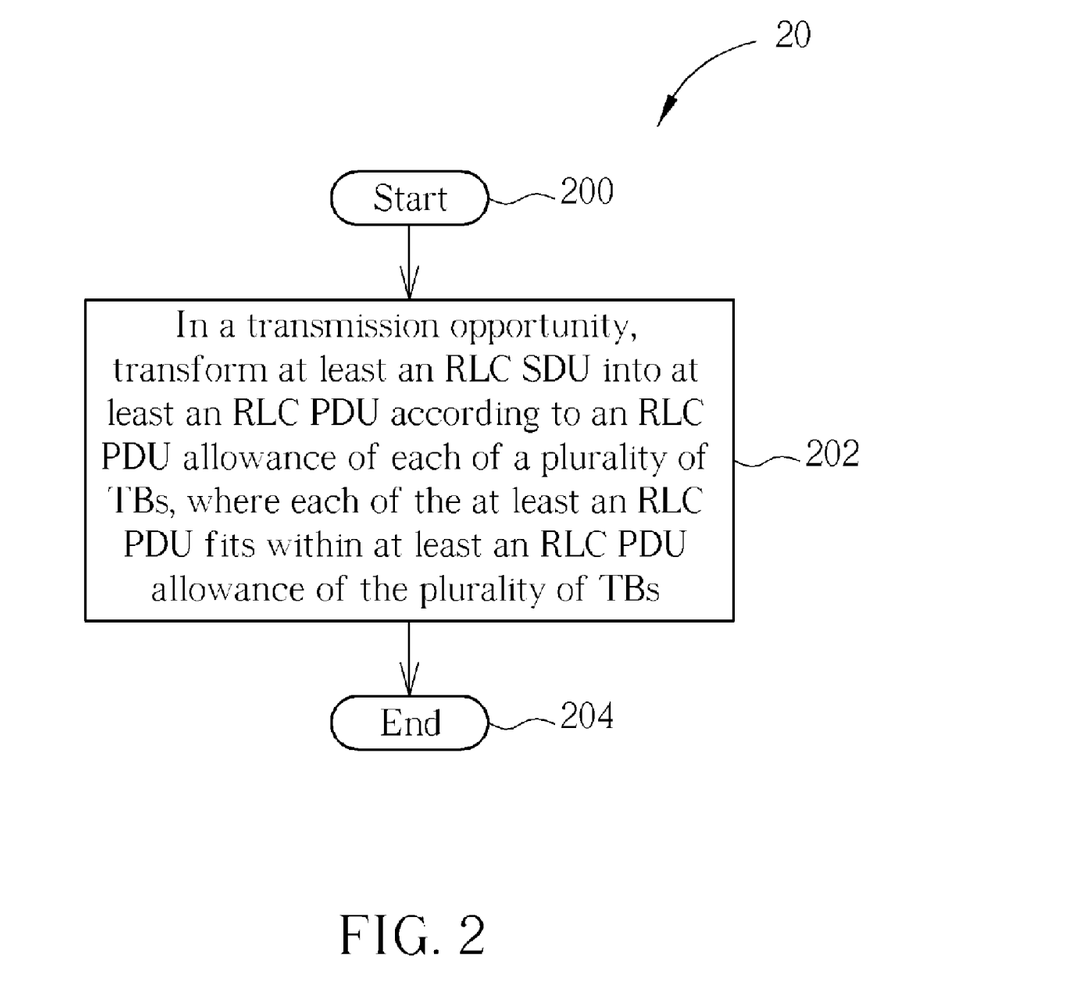
FIG. 2 is a flowchart of a process according to an embodiment of the present invention.

Please refer to FIG. 2, which illustrates a flowchart of a process 20 according to an embodiment of the present invention. The process 20 is utilized for constructing and transmitting packets with MIMO configuration in an RLC layer. The process 20 can be compiled into the program code of the storage data and includes the following steps:

Step 200: Start.

Step 202: In a transmission opportunity, transform at least an RLC SDU into at least an RLC PDU according to an RLC PDU allowance of each of a plurality of TBs, where each of the at least an RLC PDU fits within at least an RLC PDU allowance of the plurality of TBs.

Step 204: End.

According to the process 20, the RLC layer obtains the RLC PDU allowances of each TB and thereby transforms the RLC SDU(s) for transmission into one or more RLC PDUs which each fits within one of the RLC PDU allowances in a transmission opportunity.

Preferably, the RLC PDU allowance of each TB is provided by the MAC layer, which is a communication protocol layer lower than the RLC layer. Alternative, the RLC layer derives the RLC PDU allowance of each TB from allowance information provided by the MAC layer. The allowance information preferably includes a total RLC PDU allowance of the TBs and the number of the TBs.

Instead of generating the RLC PDU according to the total RLC PDU allowance in the prior art, the embodiment of the present invention generates the RLC PDU according to the total RLC PDU allowance of each TB. Thus, the RLC entity of the embodiment of the present invention does not generate an RLC PDU that exceeds all of the TB sizes.

The process 20 is used for solving the problems of the first and second scenarios in the prior art.

Applied to the first scenario, the total size of RLC PDUs is 1000 bytes, and the MAC layer of the UE indicates the RLC entity of two 500-byte RLC PDU allowances instead of a 1000-byte RLC PDU allowance. In this situation, the RLC entity constructs two 500-byte RLC PDUs for the TBs. Thus, the TBs can afford the RLC PDUs provided by the RLC entity.

Applied to the second scenario, the total size of RLC PDUs is 1000 bytes, and the MAC layer indicates the AM RLC entity of two 500-byte RLC PDU allowances for transmission. In this situation, the AM RLC entity segments the 600-byte retransmission RLC PDU into two RLC PDU segments with 495 bytes (4-byte header+491-byte data) and 113 bytes (109-byte data+4-byte header) and also generates an RLC PDU with 387 bytes from the RLC SDUs. As a result, the retransmission RLC PDU can be transmitted successfully with two segments fitting within the corresponding TBs.

As the mentioned above for the first and second scenarios, the MAC sub-headers and the MAC control elements are not taken into consideration for TB payload for simplicity.

Figure 3:
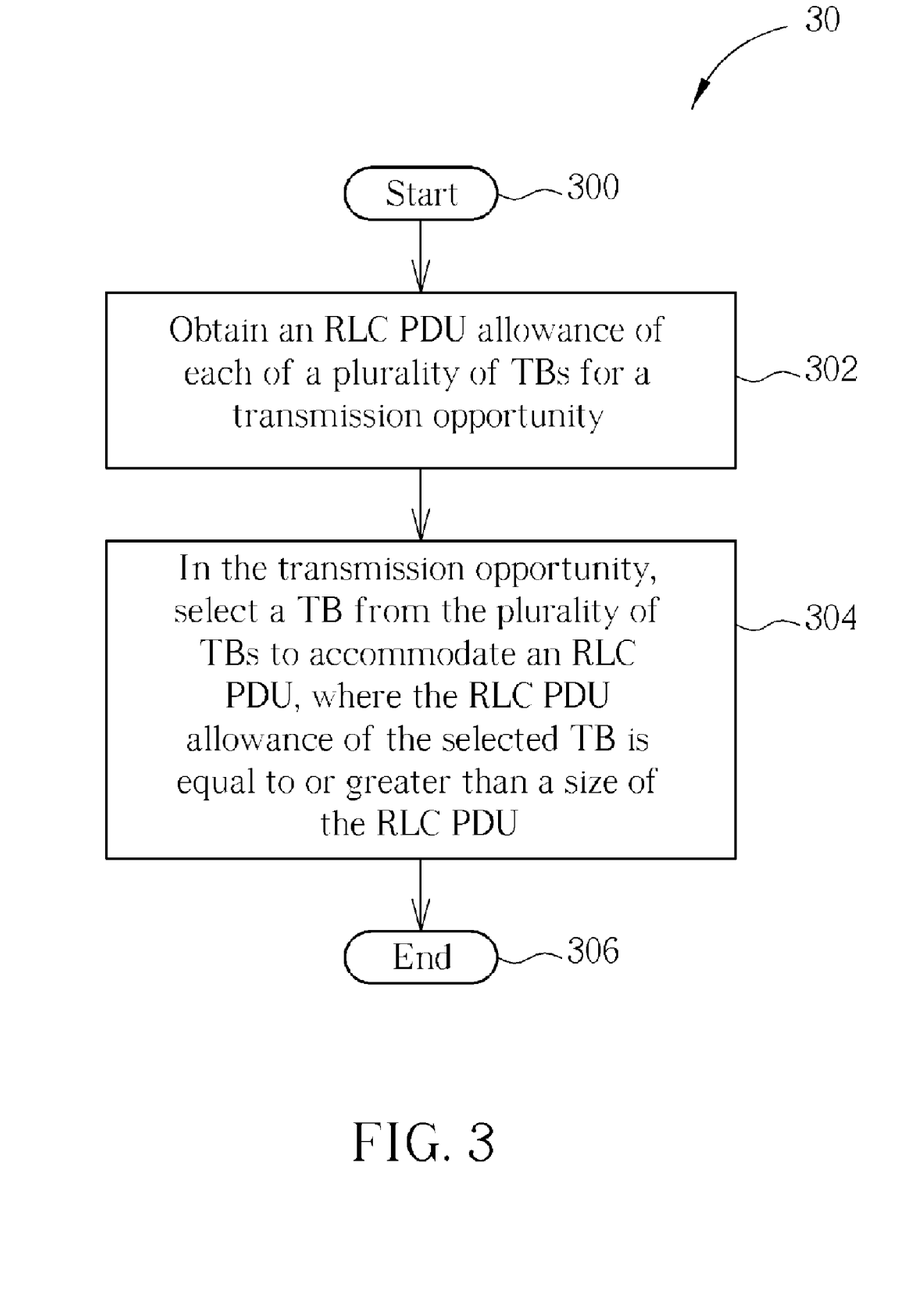
FIG. 3 is a flowchart of a process according to an embodiment of the present invention.

Please refer to FIG. 3, which illustrates a flowchart of a process 30 according to an embodiment of the present invention. The process 30 is utilized for constructing and transmitting packets with MIMO configuration in an RLC layer. The process 30 can be compiled into the program code of the storage data and includes the following steps:

Step 300: Start.

Step 302: Obtain an RLC PDU allowance of each of a plurality of TBs for a transmission opportunity.

Step 304: In the transmission opportunity, select a TB from the plurality of TBs to accommodate an RLC PDU, where the RLC PDU allowance of the selected TB is equal to or greater than a size of the RLC PDU.

Step 306: End.

According to the process 30, the RLC layer selects the TB, which can afford the RLC PDU, to accommodate the RLC PDU. That is, the RLC PDU allowance of the selected TB is equal to or greater than a size of the RLC PDU. Preferably, the accommodated RLC PDU is a retransmission or control RLC PDU.

Preferably, the RLC PDU allowance of each TB is provided by the MAC layer, which is a communication protocol layer lower than the RLC layer. Alternative, the RLC layer derives the RLC PDU allowance of each TB from allowance information provided by the MAC layer. The allowance information preferably includes a total RLC PDU allowance of the TBs and the number of the TBs.

The process 30 is used for solving the problems of the third and fourth scenarios in the prior art.

Applied to the third scenario, the MAC layer of the UE indicates the RLC entity of two 500-byte RLC PDU allowances and a TB is used for accommodating the 5-byte control RLC PDU. In this situation, instead of segmenting the retransmission RLC PDU, the other TB which exactly fits with the retransmission RLC PDU, is selected to accommodate the retransmission RLC PDU. In other words, the control and retransmission RLC PDUs are transmitted in different TBs.

Applied to the fourth scenario, the MAC layer of the UE indicates the RLC entity of two 20-byte RLC PDU allowances and a TB has been included the 1-byte short BSR. In this situation, instead of generating the partial STATUS PDU in the prior art, the other TB which exactly fits with the original STATUS PDU, is selected to accommodate the STATUS PDU. In other words, the STATUS PDU and the short BSR are transmitted in different TBs. Thus, in the particular transmission opportunity, the transmitter of the peer RLC entity can know whole information included in the STATUS PDU about transmission results of the corresponding PDUs.

Figure 4:
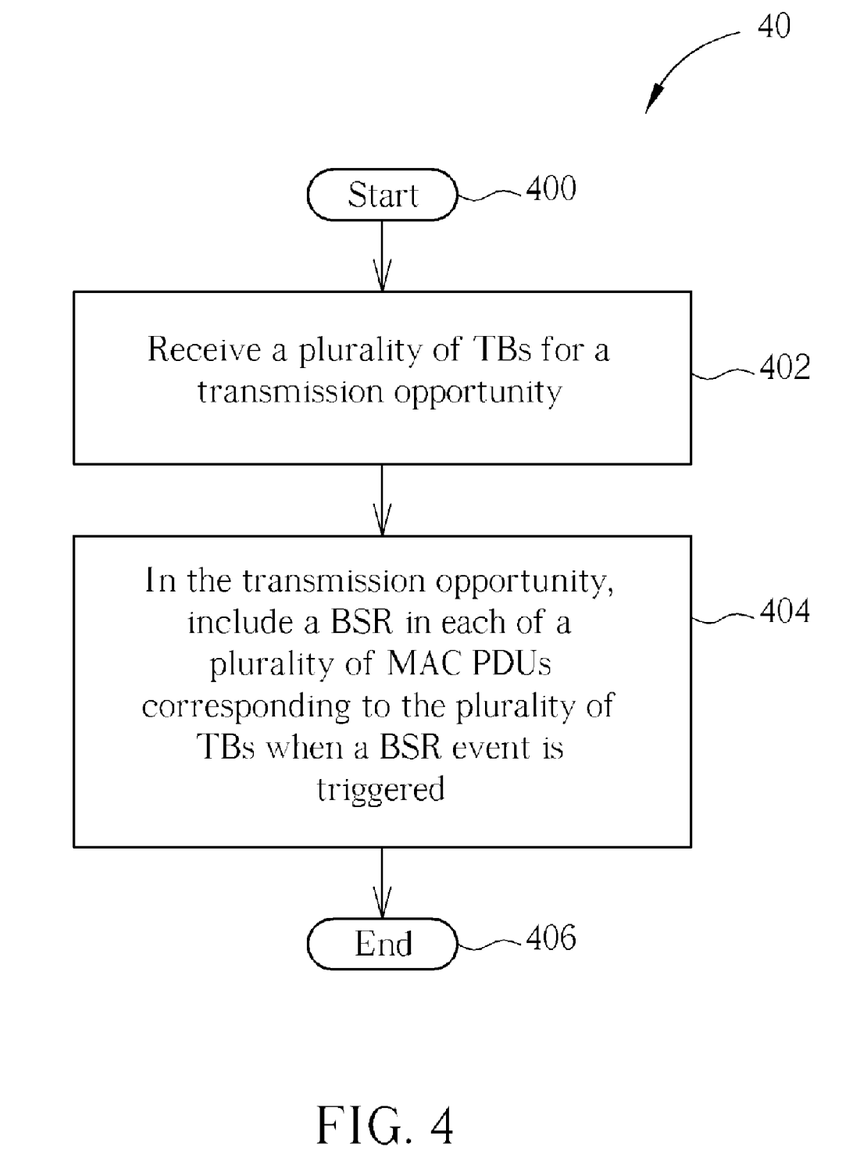
FIG. 4 is a flowchart of a process according to an embodiment of the present invention.

Please refer to FIG. 4, which illustrates a flowchart of a process 40 according to an embodiment of the present invention. The process 40 is utilized for constructing and transmitting packets with MIMO configuration in a MAC layer. The process 40 can be compiled into the program code of the storage data and includes the following steps:

Step 400: Start.

Step 402: Receive a plurality of TBs for a transmission opportunity.

Step 404: In the transmission opportunity, include a BSR in each of a plurality of MAC PDUs corresponding to the plurality of TBs when a BSR event is triggered.

Step 406: End.

According to the process 40, after receiving the plurality of TBs, the MAC layer includes a regular or a periodic BSR in each of the MAC PDUs corresponding to the TBs when a BSR event is triggered.

Preferably, any of the MAC PDUs constructed with padding bits also includes a padding BSR to further enhance the reliability of BSR reception in an eNB. In addition, the BSR event can be any of the following events: (1) uplink data (data sent from the UE to the eNB) arrives in the UE transmission buffer; (2) the UE change its serving cell; (3) a PERIODIC BSR TIMER of the UE for triggering the periodic BSR expires.

The process 40 is used for solving the problems of the fifth scenario in the prior art. In the fifth scenario, two TBs are allocated and a regular BSR is triggered. In this situation, the MAC entity includes a regular BSR in each of the MAC PDUs corresponding to the TBs. If the MAC PDUs have space for a padding BSR, the MAC PDU also include the padding BSR.

Through the process 40, as long as not all of the MAC PDUs are lost during transmission, the eNB can know the UE buffer status and thereby can provide enough resource for the UE transmission.

In conclusion, the process 20 avoids errors in RLC segment resulting in failure of MAC packet transmission. The process 30 eliminates the unnecessary RLC PDU segment and therefore can enhance packet transfer efficiency and also save system resources. The process 40 enhances the reliability of BSR reception.

Those skilled in the art will readily observe that numerous modifications and alterations of the device and method may be made while retaining the teachings of the invention.

What is claimed is:

1. A method of constructing and transmitting packets with a plurality of transport blocks in a transmission opportunity in a radio link control, hereinafter called RLC, layer of a wireless communication system, the method comprising: in the transmission opportunity, transforming at least an RLC service data unit, hereinafter called SDU, into at least an RLC protocol data unit, hereinafter called PDU, according to an RLC PDU allowance of each of the plurality of the transport blocks; wherein each of the at least an RLC PDU fits within at least an RLC PDU allowance of the plurality of the transport blocks and the RLC PDU is a retransmission RLC PDU, and the transport block whose RLC PDU allowance is greater than the size of the retransmission RLC PDU further accommodates at least a control RLC PDU.

2. The method of claim 1, wherein the RLC PDU allowance of each of the plurality of transport blocks is provided by a communication protocol layer lower than the RLC layer.

3. The method of claim 1, wherein the RLC PDU allowance of each of the plurality of transport blocks is derived from allowance information provided by a communication protocol layer lower than the RLC layer.

4. The method of claim 3, wherein the allowance information comprises a total RLC PDU allowance of the plurality of transport blocks and the number of the transport blocks.

5. A method of constructing and transmitting packets with a plurality of transport blocks in a transmission opportunity in a radio link control, hereinafter called RLC, layer of a wireless communication system, the method comprising: obtaining an RLC protocol data unit, hereinafter called PDU, allowance of each of the plurality of the transport blocks; and in the transmission opportunity, selecting a transport block from the plurality of the transport blocks to accommodate an RLC PDU; wherein the RLC PDU allowance of the selected transport block is equal to or greater than a size of the RLC PDU; wherein the RLC PDU is a retransmission RLC PDU, and the selected transport block whose RLC PDU allowance is greater than the size of the retransmission RLC PDU further accommodates at least a control RLC PDU.

6. The method of claim 5, wherein obtaining the RLC PDU allowance of each of the plurality of the transport blocks for the transmission opportunity comprises receiving the RLC PDU allowance of each of the plurality of the transport blocks from a communication protocol layer lower than the RLC layer.

7. The method of claim 5, wherein obtaining the RLC PDU allowance of each of the plurality of the transport blocks for the transmission opportunity comprises deriving the RLC PDU allowance of each of the plurality of the transport blocks from allowance information provided by a communication protocol layer lower than the RLC layer.

8. The method of claim 7, wherein the allowance information comprises a total RLC PDU allowance of the plurality of the transport blocks and the number of the transport blocks.

* * * * *